United States Patent
Breuer et al.

(10) Patent No.: US 9,672,760 B1
(45) Date of Patent: Jun. 6, 2017

(54) PERSONALIZED EEG-BASED ENCRYPTOR

(71) Applicant: INTERNATIONAL BUSINESS MACHINES CORPORATION, Armonk, NY (US)

(72) Inventors: Marcus Breuer, Dalheim (DE); Frank Krick, Ockenheim (DE); Thorsten Muehge, Budenheim (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/989,050

(22) Filed: Jan. 6, 2016

(51) Int. Cl.
G09C 1/00 (2006.01)
H04L 9/30 (2006.01)
G06N 3/08 (2006.01)
H04L 9/08 (2006.01)
H04L 9/14 (2006.01)

(52) U.S. Cl.
CPC ............... G09C 1/00 (2013.01); G06N 3/08 (2013.01); H04L 9/0861 (2013.01); H04L 9/14 (2013.01); H04L 9/30 (2013.01)

(58) Field of Classification Search
CPC G09C 1/00; H04L 9/30; H04L 9/0861; H04L 9/14; G06N 3/08
See application file for complete search history.

(56) References Cited

U.S. PATENT DOCUMENTS

| 8,065,529 | B2 | 11/2011 | Hively |
| 8,135,957 | B2 | 3/2012 | Dinges et al. |
| 2007/0081664 | A1* | 4/2007 | Avidan ............... H04L 9/3093 380/28 |
| 2009/0063866 | A1 | 3/2009 | Navratil et al. |
| 2009/0310779 | A1* | 12/2009 | Lam .................. G06K 9/00093 380/46 |

(Continued)

OTHER PUBLICATIONS

Ali Q. and Dawwd S., "On Demand Ciphering Engine Using Artificial Neural Network," the International Arab Journal of Information Technology, vol. 13, No. 4, Jul. 2016.*

(Continued)

*Primary Examiner* — Darren B Schwartz
(74) *Attorney, Agent, or Firm* — Patrick J. Daugherty; Driggs, Hogg, Daugherty & Del Zoppo Co., LPA (57) ABSTRACT

A user-specific, electroencephalogram data-based secure encryption generator maps artificial neural network neuron elements to electroencephalogram data signals generated from scanning neural activity of a user while the user executes a mental activity. Weighting factors are trained to transform the electroencephalogram data signals into a first set of weighted signals that are different from weighted signals generated from scanning neural activity of the user while the user executes another, different activity, and from weighted signals generated from scanning neural activity of another user while executing a similar mental activity. The trained weighting factors are associated with the first set of electroencephalogram data signals and the current mental activity. Thus, a reproducible electroencephalogram encryption key is defined that is unique to the user as a function of one or both of the trained weighting factors and the first weighted set of electroencephalogram data signals.

20 Claims, 6 Drawing Sheets

(56) References Cited

U.S. PATENT DOCUMENTS

| | | | | |
|---|---|---|---|---|
| 2009/0319771 | A1* | 12/2009 | Nagaraja | G06F 21/606 713/151 |
| 2012/0221075 | A1* | 8/2012 | Bentwich | A61B 5/0476 607/45 |
| 2013/0165812 | A1* | 6/2013 | Aksenova | A61F 2/72 600/544 |
| 2014/0282965 | A1 | 9/2014 | Sambamurthy et al. | |
| 2015/0058630 | A1* | 2/2015 | Bae | H04L 9/3239 713/171 |
| 2015/0304101 | A1* | 10/2015 | Gupta | G06F 21/606 380/28 |
| 2015/0347734 | A1* | 12/2015 | Beigi | G06F 21/32 713/155 |
| 2016/0103487 | A1* | 4/2016 | Crawford | G06F 3/015 600/544 |
| 2016/0219047 | A1* | 7/2016 | Jayaraman | A61B 5/04842 |
| 2016/0234174 | A1* | 8/2016 | Zizi | H04L 9/06 |
| 2016/0275300 | A1* | 9/2016 | Ko | G06F 21/602 |
| 2016/0350648 | A1* | 12/2016 | Gilad-Bachrach | G06N 3/08 |

OTHER PUBLICATIONS

Peter Mell et al, The NIST Definition of Cloud Computing, National Institute of Standards and Technology, U.S. Department of Commerce, Special Publication 800-145, 2011.

Tien Pham et al, A Study on the Feasibility of Using EEG Signals for Authentication Purpose, Neural Information Processing, Lecture Notes in Computer Science vol. 8227, 2013.

John Chuang et al, I Think, Therefore I Am: Usability and Security of Authentication Using Brainwaves, School of Information, Department of EECS, Department of Mathematics, 2013.

Touradj Ebrahimi, Identify person by unique brain activity, ringoring, Entries (RSS) Comments (RSS), Uncategorized 3 Comments, Engineering Wordpress, 2009.

Kennet Fladby, Brain Wave Based Authentication, Department of Computer Science and Media Technology Gjøvik University College, 2008.

G. Lokeshwari et al, A Novel Approach for Data Encryption Using EEG, SPIHT and Genetic Algorithm for Secured Applications, International Journal of Power Control Signal and Computation (IJPCSCS), vol. 5, No. 1, 2013.

Musheer Ahmad et al, Chaos-based Encryption of Biomedical EEG Signals using Random Quantization Technique, 4th International Conference on Biomedical Engineering and Informatics (BMEI), IEEE, 2011.

M. Teplan, Fundamentals of EEG Measurement, Institute of Measurement Science, Slovak Academy of Sciences, Measurement Science Review, vol. 2, Section 2, 2002.

Whitfield Diffie et al, New Directions in Cryptography, IEEE Transactions on Information Theory, vol. IT-22, No. 6, 1976.

Selim R. Benbadis et al, Normal Awake EEG, Overview, Waveform Description, Clinical Correlation, http://emedicine.medscape.com/article1140143-overview, 2013.

Open EEG, Welcome to the OpenEEG project, EEG for the rest of us!, http://openeeg.sourceforge.net/doc/, 2015.

Sebastien Marcel et al, Person Authentication Using Brainwaves (EEG) and Maximum a Posteriori Model Adaptation, IEEE Transactions on Pattern Analysis and Machine Intelligence, vol. 29, No. 4, 2007.

Shiv Gaglani, Personal Neuro Seeks to Combine Google Glass with EEG [Interview], Medgadget Exclusive, http://www.medgadget.com, 2014.

EEG Hacker, Detecting Concentration, http://eeghacker.blogspot.com/2014/04/detectingconcentration.html, 2014.

Neurogadget, PhD students build brain-controlled FPV drone, http://neurogadget.com/2015/05/27/phd-students-build-brain-controlled-fpv-drone/11357, 2015.

* cited by examiner

PERSONALIZED EEG-BASED ENCRYPTOR

BACKGROUND

Cryptography and cryptology refer to encryption methods, systems and techniques for transmitting secure information communications that prevent the disclosure, loss or theft of confidential, non-public text or data information within transmitted information to unauthorized receivers of the information. Encryption is the process of encoding messages or information components thereof in such a way that only authorized senders or receivers or other persons can decode and thereby access the encoded information, which may include text messages and data in a variety of formatted or raw forms. Encryption does not of itself prevent interception of a transmitted message by unauthorized receivers, but instead denies access to encoded content information within the message to the unauthorized receiver.

In an encryption scheme, secure communication information is generally encrypted using an encryption algorithm as a function of an encryption key, to generate encoded information that may be transmitted without fear of loss of the secure information within the message as the encoded message may only be read if decrypted in a subsequent encryption algorithm step or process that uses the same key or other appropriate decryption key. An authorized recipient can easily decrypt the message by application of the decryption key, wherein interceptors or other unauthorized receivers are denied access to the secure data within the encoded message without the decryption key.

Encryption methods include symmetric key encryption and public key encryption. In symmetric key encryption, the encryption and decryption keys are the same, and senders and authorized receivers use the same key in order to encode and decode the message, respectively. Accordingly the symmetric key must be kept confidential and secure from any other unauthorized receivers in order to prevent decoding and loss of confidentiality and security of the encrypted message information content.

Public key encryption uses public and private key pairs for encryption and decryption, wherein an authorized receiver uses a cryptographic algorithm to generate their own private key from a public key and then uses their private key to decode encoded messages. Unlike symmetric key, public key encryption does not require a secure channel for an initial exchange of secret keys between the parties, and the public key may be published without compromising security. Strength of security instead depends instead on the impossibility, or computational impracticality, of an unauthorized receiver determining a properly generated private key from the corresponding public key.

Cryptographic algorithms used to generate public key are generally based on mathematical problems that admit no efficient solution, for example those inherent in certain integer factorizations, discrete logarithms, elliptic curve relationships, etc.

BRIEF SUMMARY

In one aspect of the present invention, a method for a secure encryption generator based on user-specific electroencephalogram data includes mapping artificial neural network neuron elements to a first set of electroencephalogram data signals generated from scanning neural activity of a user while the user executes a current mental activity. A first set of artificial neural network neuron element weighting factors are trained to transform the first set of electroencephalogram data signals into a weighted set of electroencephalogram data signals that are different from a weighted set of electroencephalogram data signals generated from scanning neural activity of the user while executing another, different activity, and from a weighted set of electroencephalogram data signals generated from scanning neural activity of another user while executing a similar mental activity. The trained set of artificial neural network neuron element weighting factors is associated with the first set of electroencephalogram data signals and the current mental activity. Thus, a reproducible electroencephalogram encryption key is defined that is unique to the user as a function of one or both of the trained set of artificial neural network neuron element weighting factors and the first weighted set of electroencephalogram data signals.

In another aspect, a system has a hardware processor in circuit communication with a computer readable memory and a computer-readable storage medium having program instructions stored thereon. The processor executes the program instructions stored on the computer-readable storage medium via the computer readable memory and thereby maps artificial neural network neuron elements to a first set of electroencephalogram data signals generated from scanning neural activity of a user while the user executes a current mental activity. A first set of artificial neural network neuron element weighting factors are trained to transform the first set of electroencephalogram data signals into a weighted set of electroencephalogram data signals that are different from weighted set of electroencephalogram data signals generated from scanning neural activity of the user while the user executes another, different activity, and from a weighted set of electroencephalogram data signals generated from scanning neural activity of another user while executing a similar mental activity. The trained set of artificial neural network neuron element weighting factors is associated with the first set of electroencephalogram data signals and the current mental activity. Thus, a reproducible electroencephalogram encryption key is defined that is unique to the user as a function of one or both of the trained set of artificial neural network neuron element weighting factors and the first weighted set of electroencephalogram data signals.

In another aspect, a computer program product for a user-specific, electroencephalogram data-based secure encryption generator has a computer-readable storage medium with computer readable program code embodied therewith. The computer readable hardware medium is not a transitory signal per se. The computer readable program code includes instructions for execution which cause the processor to map artificial neural network neuron elements to a first set of electroencephalogram data signals generated from scanning neural activity of a user while the user executes a current mental activity. A first set of artificial neural network neuron element weighting factors are trained to transform the first set of electroencephalogram data signals into a weighted set of electroencephalogram data signals that are different from weighted set of electroencephalogram data signals generated from scanning neural activity of the user while the user executes another, different activity, and from a weighted set of electroencephalogram data signals generated from scanning neural activity of another user while executing a similar mental activity. The trained set of artificial neural network neuron element weighting factors is associated with the first set of electroencephalogram data signals and the current mental activity. Thus, a reproducible electroencephalogram encryption key is defined that is unique to the user as a function of one or both of the trained set of artificial neural network neuron element weighting factors and the first weighted set of electroencephalogram data signals.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
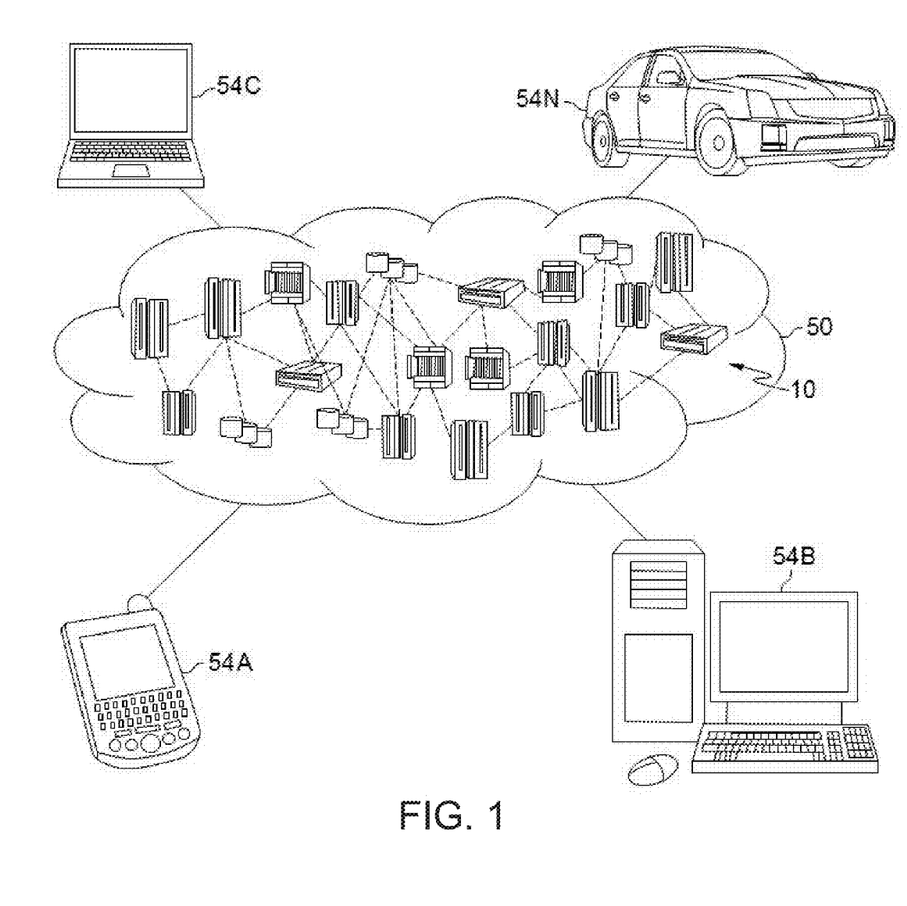
FIG. 1 depicts a cloud computing node according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
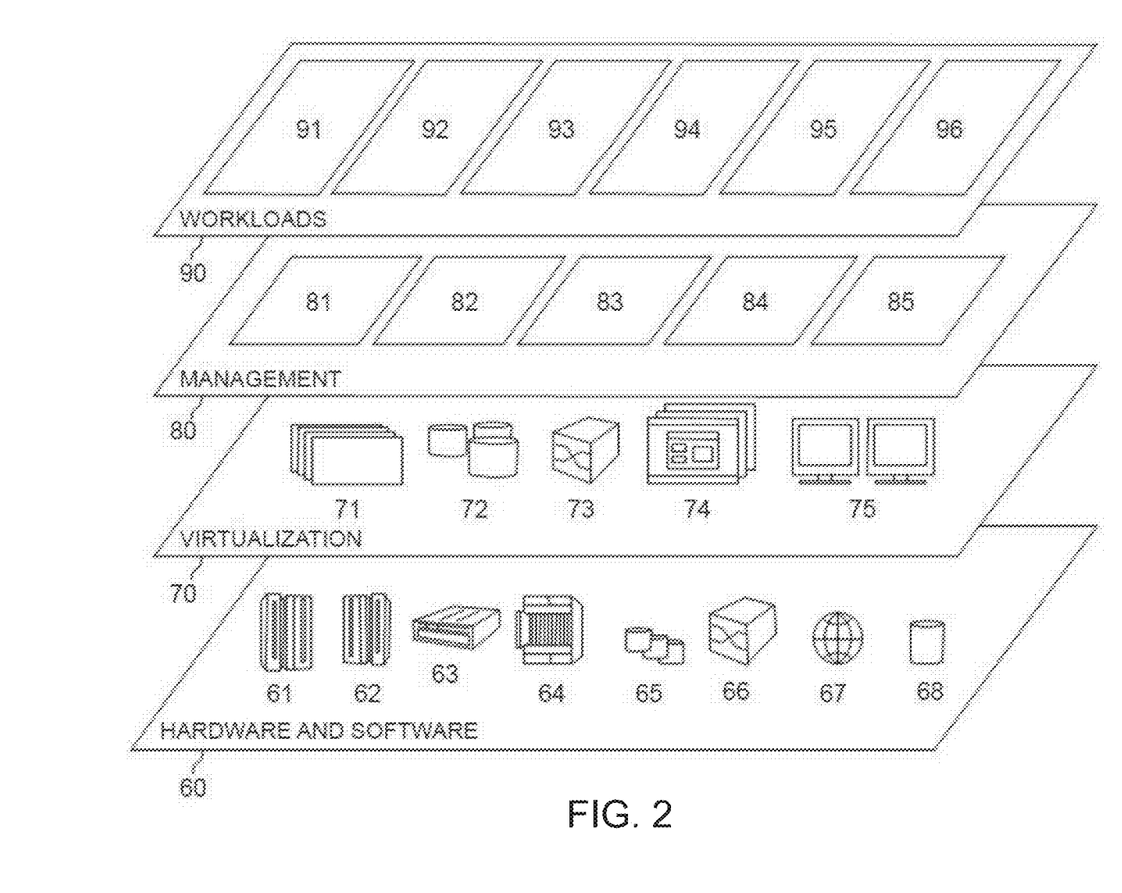
FIG. 2 depicts a cloud computing environment according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for a secure encryption generator based on user-specific electroencephalogram data as described below.

Figure 3:
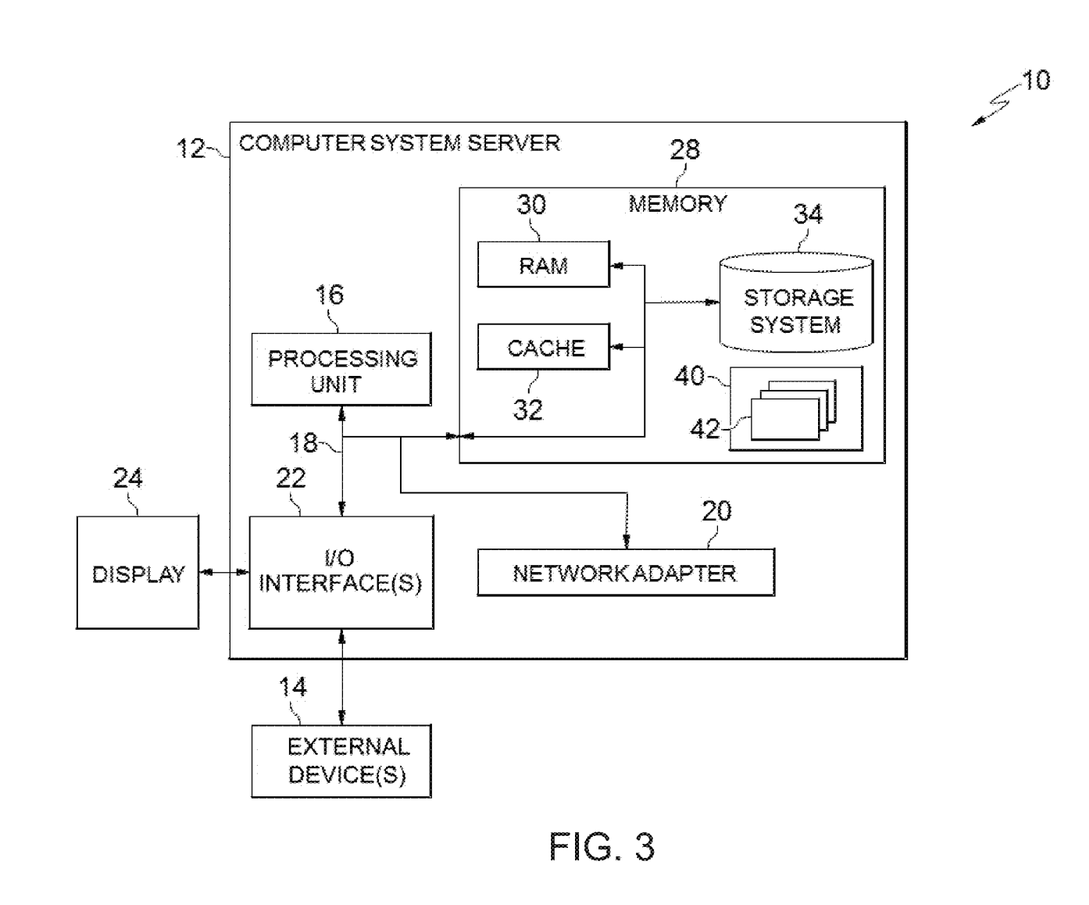
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In a public key cryptographic system, a first unique user (for example, User A or "Alice") has a public encryption key ($E_A$) and a second unique user (for example, User B or "Bob") has a public encryption key ($E_B$) that are that are generally available to each other. Alice may send a secure and encrypted message to Bob by obtaining Bob's public encryption key ($E_B$) and using it to encrypt original message content ("M") into an encrypted message, which may be denoted as "$E_B(M)$". Bob may use his private decryption key ("$D_B$") to decrypt the encrypted message, which may be denoted as the expression "$D_B(E_B(M))=M$." While the respective decryption and encryption processes may be easy to compute by an unauthorized person who intercepts or otherwise acquires the encrypted message, security of the message relies on the fact that it is computationally impractical for the unauthorized person to derive the decryption key ($D_B$) from the encryption key ($E_B$).

An electronic signature process may also be used to enhance security in confidential communications, wherein a unique signature is used as a secure method of proof of identity for a receiver of an encrypted message (for example, User A or "Alice") that a received message was sent by an expected sender (for example, User B or "Bob"), which may be denoted by the expression "$E_B (D_B (M)=M$," which signifies using a decryption key ($D_B$) for encryption and an encryption key ($E_B$) for decryption of message content "M." If Bob wants to sent a signed message "M" to Alice, Bob may sign the message with an unique signature "S" that is determined as a function of his private decryption key ("$D_B$"), which may be denoted as "$S=D_B(M)$." Bob then encrypts a signature/message pair using Alice's public encryption key ($E_A$) for transmission to Alice, which may be denoted as "$E_A (S)$." For decryption Alice uses her private decryption key to generate S, according to "$S=D_A (S)$," and to obtain the message content Alice uses Bob's public encryption key ($E_B$), which may be denoted as "$M=E_B (S)$." Alice may thereby receive Bob's message content (M) and his signature (S).

Electronic signature and public key cryptographic systems and processes present certain inadequacies. While technically very difficult, it is not impossible to derive an alphanumeric private decryption key (or an alphanumeric input used to generate the key) from a publicly available encryption key. Further, if security is not maintained and an unauthorized person acquires a private decryption key (for example, by fraud), it is possible for the unauthorized person to sign messages under the false pretense that they are an authorized person, as well as decrypt messages not intended for the unauthorized person.

Aspects of the present invention provide systems and method for generating encryption keys and signatures from personalized weighting factors that are derived from and applicable to electroencephalogram ("EEG") data that is unique to an individual sender or receiver of secure messages. Electroencephalography is a medical technique that reads scalp electrical activity generated by brain structures. When brain cells (neurons) are activated, local current flows are produced. The EEG comprises electrical activity of an alternating type recorded from detection from the scalp surface by metal electrodes and other conductive media.

EEG data is generated by measuring voltages on the scalp generated by brain activities. EEG data generated by brain activity patterns may form wave shapes that are commonly sinusoidal and when measured from peak to peak and normally range from 0.5 to 100 μV in amplitude.

By means of Fourier transform or other processes, power spectrums from the raw EEG signals may be derived. In the derived power spectrum contributions of sine waves with different frequencies are visible. Although the spectrum is continuous, ranging from zero Hertz (Hz) up to one half of sampling frequency, the brain state of an individual may make certain frequencies more dominant. EEG power spectrum data is commonly differentiated into four basic different groups of brain waves that are distinguished by different ranges of frequency values: beta wave signals that have a frequency of greater than 13 Hz, alpha waves signals that have a frequency ranging from 8 Hz to 13 Hz, theta waves signals that have a frequency ranging from 4 Hz to 8 Hz, and delta waves signals that having a frequency of from about 0.5 Hz to 4 Hz EEG data has attributes that are unique to the physiology of the individual user, and aspects for the present invention focus on the differences between personal EEG data sets to define unique weighting sets for individual users that are not transferrable or replicable between different users.

Further, evoked potentials or event-related potentials (ERPs) are significant voltage fluctuations resulting from evoked neural activity. An evoked potential may be initiated by an external or internal stimulus. Mental operations, such as those involved in perception, selective attention, language processing, and memory, proceed over time ranges in the order of tens of milliseconds. ERPs can help in defining the time course of these activations. Amplitudes of ERP components are often much smaller than spontaneous EEG components and thereby not readily recognizable within EEG trace data. They may be extracted from sets of EEG data recordings by digital averaging of epochs (recording periods) of EEG time-locked to repeated occurrences of sensory, cognitive, or motor events. Spontaneous background EEG fluctuations, which are random relative to time points when the stimuli occurred, may be averaged out, leaving event-related brain potentials. The remaining electrical signals reflect only that activity which is consistently associated with the stimulus processing in a time-locked way. The ERP thus reflects, with high temporal resolution, the patterns of neuronal activity evoked by a stimulus.

A brain computer interface (BCI) is a communication system that recognizes a user's command from EEG or ERP brainwave data generated by thinking of the command or executing a physical movement associated with the command. The EEG or ERP brainwave data associated with a mental command activity may be distinguished from data for other commands or activities, for example by identifying unique brain region activity combinations, or EEG or ERP profiles that are defined by subsets or portions of one or more of the beta, alpha, theta or delta wave signals that differ from the profile of a different activity.

Prior art BCI techniques focus on comparing EEG or ERP brainwave data of multiple people to identify gross or large-scale similarities that are associated with the mental activities of two or more people thinking of the same command, for example "move eyes left", so that a common command may be recognized from the EEG data attributes of different people. In contrast, aspects of the present invention focus on determining weightings for components or attribute of EEG or ERP data that both enable replication in association with a common mental activity (command, thought, etc.), and are unique to the individual person, like a unique fingerprint. Thus, the EEG data of one person thinking of a same command as another person will have a different weighted EEG data relative to the other person, independent of any gross similarities in their raw EEG data. This will prevent the EEG data of the other person from being used in the stead of the weighted EEG data of the first person.

Figure 4:
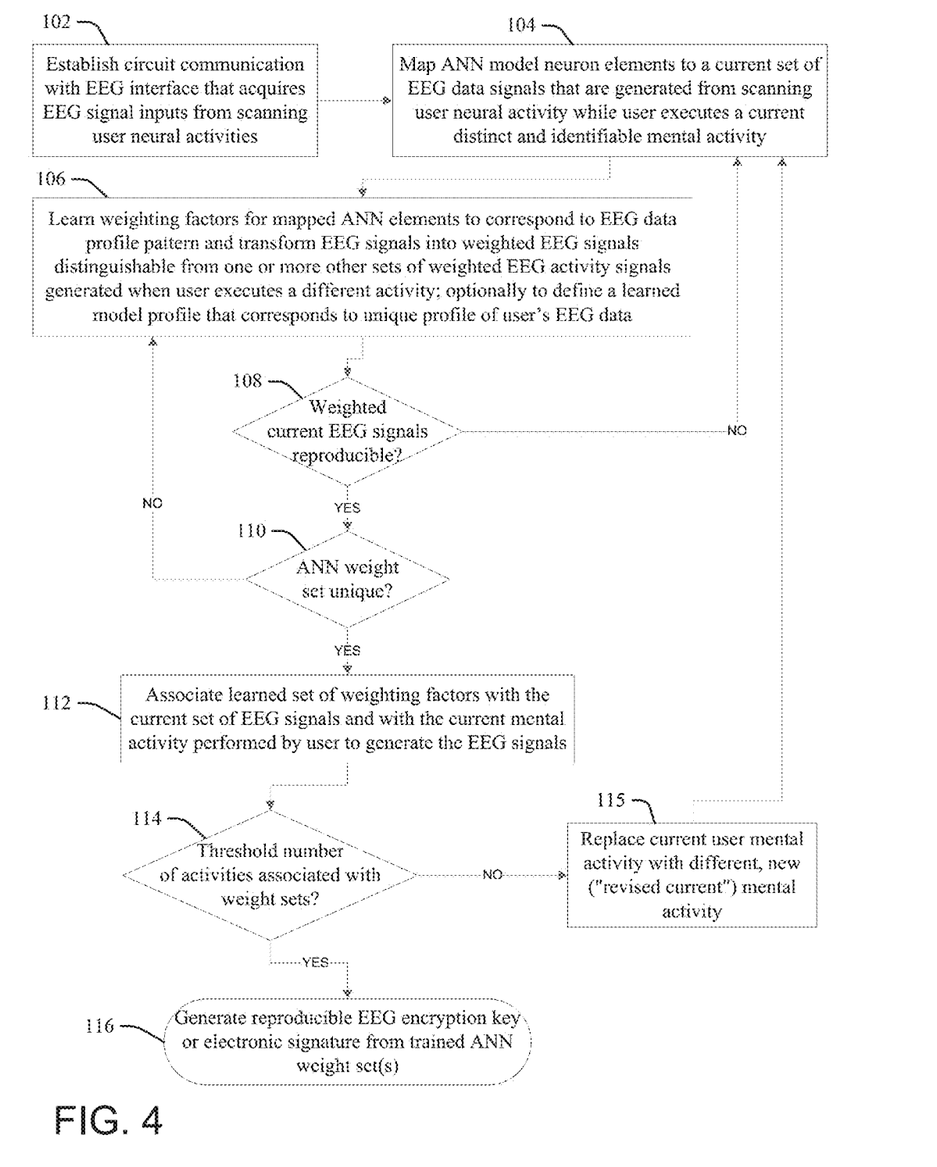
FIG. 4 is a flow chart illustration of a method or process according to an aspect of the present invention for a secure encryption based on user-specific electroencephalogram data.

FIG. 4 illustrates a computer implemented (method or process) of an aspect of the present invention wherein a processor (for example, a central processing unit (CPU)) that executes code (such as code installed on a storage device in communication with the processor) that is in circuit communication with an EEG interface trains an "artificial neural network" (ANN) weighting model for a user that is used to generate a signature or private encryption key for the user from EEG signal inputs generated by neural activity of a user.

At 102 the processor establishes a circuit communication with an EEG interface that acquires current (first) EEG data signal inputs generated by scanning current neural activities of a user.

At 104 ANN model neuron elements are mapped to a current (first) set of EEG data signals generated from scanning current neural activity of the user while (during a time period that) the user executes a current distinct and identifiable mental activity.

At 106 a current (first) set of ANN model weighting factors (or weighting) are learned (trained or generated) to represent or transform the current set of EEG signals into a weighted set of EEG activity signals that are distinguishable from at least one other (second) set weighted of EEG activity signals that are generated when the user is executing a different mental activity by the user, and from another (third) weighted set of electroencephalogram data signals that are generated from scanning neural activity of another user while the user executes a mental activity that is the same, similar or analogous to current mental activity.

The weighted ANN model thus comprises a plurality of "neuron" weighting elements that may be described as exchanging messages between each other via numerically weighted decision connections that are tuned (weighted) to correspond to the neural processes of the user represented by EEG data. The other activities by the same user may be a baseline rest state, representing a null activity or "zero" value, wherein the current activity is a positive activity having value of "one", or any other neural activity by the user that is different and distinguishable from the activity used to generate the first set of EEG signal data.

The ANN model weight set is trained into a (first) learned set of weighting factors at 106 by setting the weightings to correspond to EEG data (which may include ERP data) profile patterns that are distinguished and replicated within the user's EEG data when the user goes through repetitive iterations of an associated mental activity (particular muscle movement, image or command visualization, etc.). Training the weighting factors causes them to correspond to EEG data profile pattern distinguished and replicated within the user's EEG data when the user goes through repetitive iterations of associated mental activity.

In some aspects, the training at 106 of the learned ANN model weights further defines a learned model profile or relationship of the weights relative to each other that corresponds to values of the user's EEG data that are unique and personal to the user, essentially like an EEG fingerprint that is unique to the user supplying the current EEG data. By conforming a profile of the weightings to an EEG data profile that is unique to the user, security is enhanced: the weightings may not be replicated by another person, since they will have different and distinguishable personal EEG data.

A variety of different process may be practiced in measuring or representing the EEG signal data and in defining their associated weights at 106 in order to distinguish EEG signal data generated by different mental activities, and to thereby generate a complex and unique weighting set. Generally EEG signals are very low frequency signals, which are readily modulated into a higher digital carrier frequency for transmission or processing. Illustrative but not exhaustive examples of EEG signal processing according to the present invention include frequency or amplitude measurements, filtering, Fourier spectrum transformations and analysis, and still other options will be appreciated by one skilled in the art.

A variety of components and attributes of the EEG signal data may be mapped to the ANN weighting elements at 104 to amplify certain attributes of the EEG signal set data into a unique EEG data representation that is distinguished from other EEG data inputs. In one example a subset of one or more of the four different basic wave types (beta, alpha, theta and delta) is selected and weighted in response to determining that the selected EEG signals are sufficient to distinguish the EEG signal set from the sets generated from other mental activities.

The reproducibility of the weighted current (first) set of EEG activity signals is iteratively tested at 108, by prompting the user to repeat the current activity and again generate the EEG signals mapped to the ANN elements at 104 and weighted by the learned weights at 106 until a number of weighted transformations of the EEG data obtained from each iteration match with a threshold degree of similarity and frequency (for example, over 50%, 66.7%, 75%, 90% of three or more repetitions). In some aspects the assessment directly informs the user supplying the current EEG signals (for example, visually via a graphical user interface (GUI) display device, and/or acoustically through audio instructions), in a real-time feedback process, as to whether the current EEG signals have a sufficient reproducibility and distinctiveness qualities to be used in combination with other, different and distinct weighted EEG signal sets provided by the user to generate a valid personal signature.

Upon verification at 108 that generation of the weighted signals is repeatable by the user, at 110 the uniqueness of the ANN weight set is verified. For example, the weighting values must be computationally complex enough that they cannot be replicated by another. If not, then the weights are relearned (retrained) in additional iterations at 106. The testing processes at 108 and 110 confirms that the EEG activity signals associated with the activity may be replicated by the person (first user) for each repetition, and that the learned weightings are sufficiently unique to be secure from discovery and use by another person.

At 112 the current (first) learned set of weighting factors that are verified as repeatable at 108 and sufficiently unique at 110 are associated with the current (first) set of EEG signals and with the current distinct, reproducible and identifiable mental activity that was performed by the user to generate the current set of EEG signals.

A single ANN weight set may be used to define a reproducible EEG encryption key or electronic signature that is unique to the user, though some aspects use combinations or patterns of multiple, different ANN weight sets that are each associated with a different activity to define the reproducible EEG encryption key or electronic signature. Thus, the present example includes an optional step at 114 that determines whether a threshold number of different reproducible and identifiable mental activities of the user are identified and associated with their own distinct sets of ANN weights trained for their respective EEG data sets. For example, the threshold number may be at least two to define a binary set of different user identified mental activities that may be combined into sequences or even Boolean combination values, wherein the user may generate a pair of different EEG signal outputs from two distinct activities that signify at least different binary inputs, for example "yes" or "no", "one" or "zero", etc.

If determined that the threshold number is not yet generated at 114, the "current" user mental activity is replaced with a new, different ("revised current") mental activity at 115 and the process returns to 104, wherein the revised current activity is used to generate another set of EEG data and associated weight sets via the processes at 104-106-108-110-112 to generate another set of EEG signals that are reproducible in weighted form as a function of the user's ANN weight set. This process iteratively repeats until the threshold number is met at 114, wherein the process ends by generating at 116 a reproducible EEG encryption key or electronic signature from at least one of the trained ANN weight sets.

Different activities that generate different respective EEG signal sets at 104 that may be replicable as weighted by the trained ANN model weights may be defined at a variety of granularities. For example, different respective activities used to generate weighted sets of EEG appropriate for defining personal signature signals may include EEG signal generated in response to directing muscle movements or the absence thereof, such as user eyeball movements, specific hand movements and patterns (such as to trace out or write an alphanumeric character), and other sequential combinations of a variety of different movements, as well as signals generated from "no activity" or "pauses" in movement wherein the user holds him or herself still and makes no volitional muscle movements for a "pause" period of time. The different respective activities may also include different mental thoughts, exercises or processes, including memorizing or recalling a specific image or picture, different alpha-numeric characters.

Thus, aspects of the present invention use ANN model estimates or approximations of neural functions of the user that are represented by the EEG inputs as a system ("net") of interconnected components ("neurons") that exchange messages between each other and have numeric weights that are tuned to generate a unique set of weight values that function as a unique signature or encryption key for the user, wherein only the EEG signal data of the user will be transformed into the expected, reproducible values.

Figure 5:
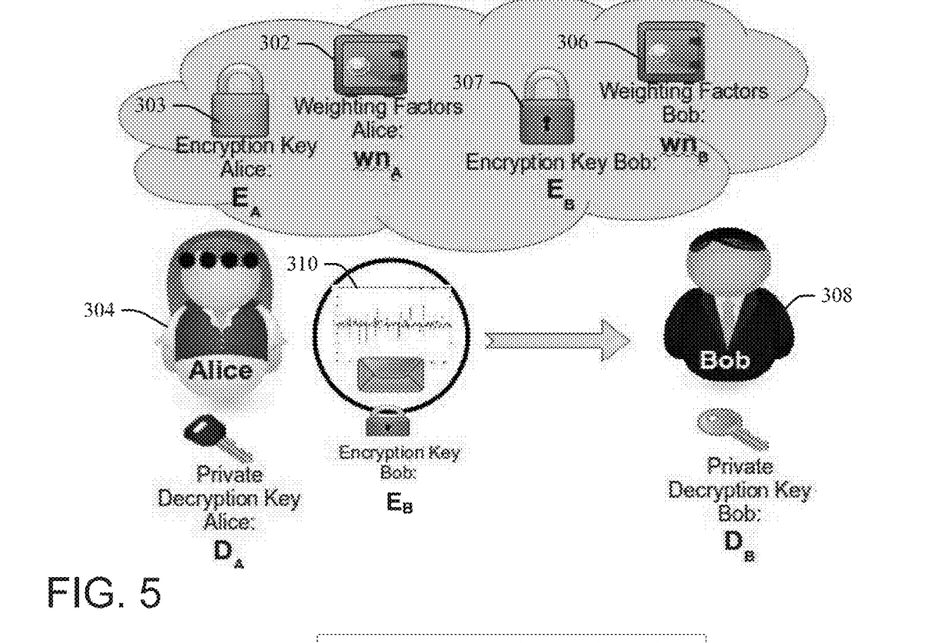
FIG. 5 is a graphic illustration encrypting a message as a function of personalized weighting factors according to of the present invention.

FIG. 5 is a graphic illustration of an embodiment of the present invention wherein the personalized weighting factors ("$wn_A$") 302 of a sender ("Alice") 304 and the personalized weighting factors ("$wn_B$") 306 of a receiver ("Bob") 308 (as determined at 106 of FIG. 4) are made publicly available with their respective public encryption keys ("$E_A$") 303 and ("$E_B$") 307. A personal EEG signature signal 310 of the sender 304 is encrypted with the receiver's public encryption key ("$E_B$") 307 and sent to the receiver, wherein the personal EEG signature signal 310 is verified by the receiver using the publicly available personalized weighting factors of the sender "$wn_A$" 302 as generated by an ANN model according to the embodiment of FIG. 4.

Figure 6:
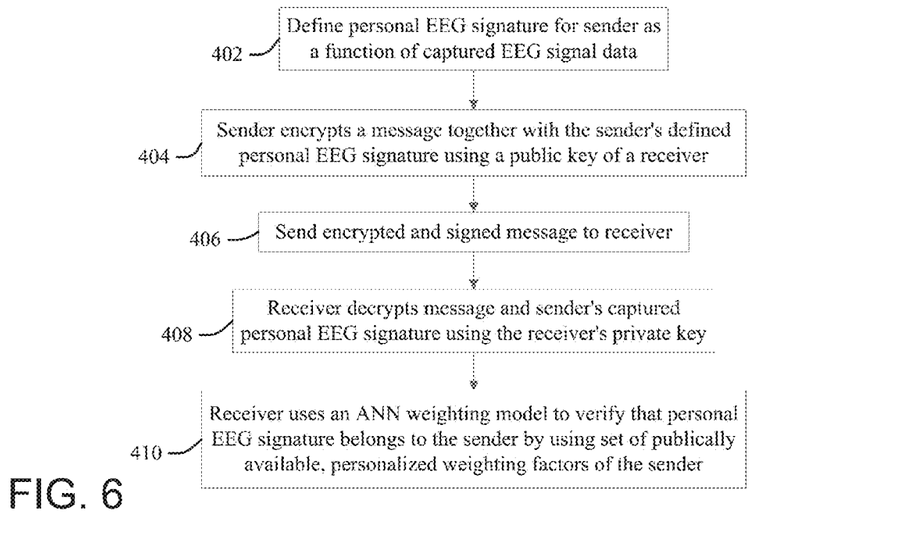
FIG. 6 is a flow chart illustration of an alternative embodiment of the present invention for defining a personal message signature.

FIG. 6 illustrates an alternative embodiment of the present invention wherein at 402 a personal EEG signature is defined for a sender as a function of captured, reproducible EEG signal data generated by the sender (for example, as acquired via an EEG device interface). In some examples the definition of the EEG signature includes weighting the captured, reproducible EEG signals data, for example, via the ANN model process of 106, FIG. 4. A standard, Fourier transformation or other non-personal weighting or transformation may be also applied to the captured EEG signal data to define the personal EEG signature, and a unique, personal profile or quality of the underlying raw EEG data may be identified to distinguish the personal EEG signature from signatures generated for any other user from their own EEG data.

At 404 the sender encrypts a message together with the sender's captured personal EEG signature using the public key of the receiver.

At 406 the sender sends the encrypted and signed message to the receiver.

At 408 the receiver decrypts the message and sender's captured personal EEG signature using the receiver's private key, and at 410 the receiver will use an ANN weighting model defined according to the present invention (for example, via the process of FIG. 4) to verify that said personal EEG signature belongs to the sender by using the set of publically available, personalized weighting factors of the sender.

In some examples, verification of the sender's captured personal EEG signature at 410 permanently destroys the EEG signature, which enhances security by ensuring that the sender's captured personal EEG signature is not misused or disclosed publicly by the receiver.

Figure 7:
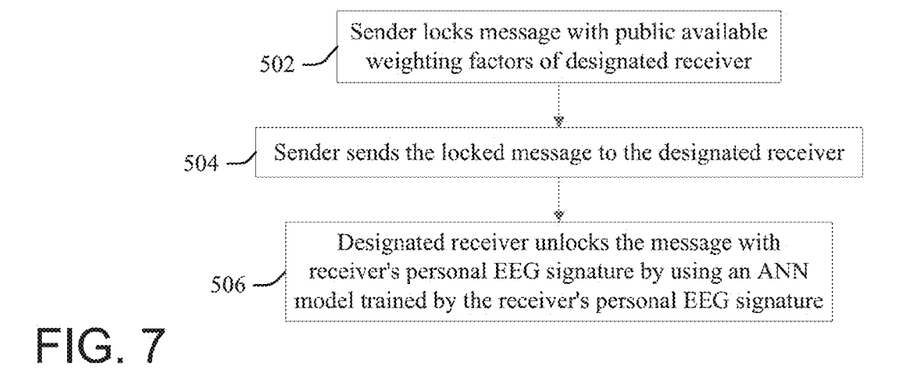
FIG. 7 is a flow chart illustration of another embodiment of the present invention for encrypting information for designated receivers.

FIG. 7 illustrates another, alternative embodiment of the present invention that encrypts information for one person only, wherein only one designated receiver may unlock the message via their own, personal EEG signature. At 502 a sender locks a message via a public key encryption process with the publicly available weighting factors of the designated receiver functioning as a public key; and sends the locked message to the designated receiver at 504. At 506 the designated receiver unlocks the message with the receiver's personal EEG signature by using an ANN model trained by the receiver's personal EEG signature (for example, as trained in generating the receiver's personal EEG signature at 106 of FIG. 4). The decryption at 506 is dependent upon provision of the receiver's unique, personal EEG signature, and thus no other receiver will have an appropriate personal EEG signature that is able to unlock the message.

Thus, aspects of the present invention enable the use of human brain EEG signals as a unique electromagnetic fingerprint, wherein a user may "think" about a password, image, vision or story that is used to securely identify the person and grant access to secure messages, as well as achieve access to other secure items, activities and areas, such as online financial and social media accounts, insurance policies, effecting payment for transportation fares and tolls, etc.

Aspects may be easily and efficiently deployed via wearable EEG sensors that can be integrated into a hat, baseball cap, spectacles and sunglasses, headbands, earphones, hair clips, ear rings, etc., that enable EEG electrodes to be placed upon or close enough to the user's head surface to detect EEG signals, and which may be transferred securely via encrypted Bluetooth®, Wi-Fi or other wireless network connections to a user's smart phone or other portable, programmable device. (BLUETOOTH is a trademark of Bluetooth SIG in the United States or other countries.) Because the EEG signals are very low frequency they can also be modulated onto a higher digital carrier frequency, including via unique ANN model weightings trained for each person, enabling the transfer of captured EEG signals to another computer device in an optimal quality via an encrypted network connection.

Aspects offer obvious advantages over prior art private key and signature systems and methods that rely on the provision of personal identification and passwords for online business such as online shopping and online banking. Such prior art private keys and signatures can be used by other parties, or manipulated. For example, unique biometric fingerprint ID's may be "stolen" (for example, taken from a glass or other surface or medium, re-created or transferred onto a transparent tape and used to gain access to a secure system via a fingerprint scanner. Humans may also intentionally or unintentional divulge passwords and user ID's to others, who may use them to gain unauthorized access to messages, accounts, etc.

In contrast, security is enhanced by aspects of the present invention as signatures and passwords created for a user are not stored within any programmable device, but are instead replicated by the person at will in the form of the procedure that the user will mentally execute to recreate generation of the password via use of the ANN model trained by the user during creation of the password or signature. The imagined password is thereby transformed into something that is unique to the human who is thinking of the password, since the EEG data generated by each person is unique to their individual brain physiology. Disclosure of the mental activity used to generate the password will not disclose the generated password itself, as another person "thinking" of the same password will not generate the same captured EEG signal, as weighted by the user's personal ANN model weightings.

Relative to the prior art, the EEG-based aspects of the present invention provide for enhanced security for the exchange of electronic information, including electronic messages (email, simple message system (SMS), chats, instant messages (IM's), etc.), the exchange of data in public clouds (files, pictures, films and other files), audio communications, video communications, etc. Aspects generate an ultra-secure EEG signature that is used as a signature for the electronic exchange of information and communication, and to dedicate information for one person only.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a secure encryption generator based on user-specific electroencephalogram data, the method comprising executing on a computer processor the steps of:

mapping each of a plurality of artificial neural network neuron elements to a first set of electroencephalogram data signals that are generated from scanning neural activity of a user while the user executes a current mental activity;

training a first set of artificial neural network neuron element weighting factors to transform the first set of electroencephalogram data signals into a first weighted set of electroencephalogram data signals that are different from second weighted set of electroencephalogram data signals that are generated from scanning neural activity of the user while the user executes another activity that is different from the current mental activity, and from a third weighted set of electroencephalogram data signals that are generated from scanning neural activity of another user while the another user executes a mental activity that corresponds to the current mental activity;

associating the trained first set of artificial neural network neuron element weighting factors with the first set of electroencephalogram data signals and with the current mental activity;

defining a reproducible electroencephalogram encryption key that is unique to the user as a function of at least one of the trained first set of artificial neural network neuron element weighting factors and the first weighted set of electroencephalogram data signals;

locking message content via a public key encryption process with the trained first set of artificial neural network neuron element weighting factors functioning as a public key; and sending the locked message to the user as a designated receiver.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the steps of mapping each of the plurality of artificial neural network neuron elements to the first set of electroencephalogram data signals, training the first set of artificial neural network neuron element weighting factors, associating the trained first set of artificial neural network neuron element weighting factors with the first set of electroencephalogram data signals and with the current mental activity, defining the reproducible electroencephalogram encryption key that is unique to the user as the function of at least one of the trained first set of artificial neural network neuron element weighting factors and the first weighted set of electroencephalogram data signals, locking the message content via the public key encryption process with the trained first set of artificial neural network neuron element weighting factors functioning as the public key, and sending the locked message to the user as the designated receiver.

3. The method of claim 2, wherein the computer-readable program code is provided as a service in a cloud environment.

4. The method of claim 1, further comprising:

defining a personal electroencephalogram signature for the user as a function of at least one of the trained first set of artificial neural network neuron element weighting factors and the first weighted set of electroencephalogram data signals; and wherein the user is enabled to unlock the message with the personal electroencephalogram signature defined for the user by using the at least one of the trained first set of artificial neural network neuron element weighting factors and the first weighted set of electroencephalogram data signals.

5. The method of claim 1, wherein the step of training the first set of artificial neural network neuron element weighting factors further comprises:

defining a learned model profile of the artificial neural network neuron element weighting factors that corresponds to values of the first weighted set of electroencephalogram data signals that are unique to the user and different from values of the third weighted set of electroencephalogram data signals that are generated from scanning the neural activity of the another user while the user executes the current mental activity.

6. The method of claim 1, wherein the current mental activity comprises at least one of directing muscle movements, tracing out an alphanumeric character, pausing volitional movement activity for a pause period of time, and recalling a specific image.

7. The method of claim 1, wherein the step of training the artificial neural network neuron element weighting comprises defining numerically weighted decision connections between the plurality of neuron elements for exchange of messages between each other that are tuned to correspond to neural processes of the user that are represented by electroencephalogram data.

8. The method of claim 1, further comprising:

defining a personal electroencephalogram signature for the user as a function of weighting the first set of electroencephalogram data signals with the trained first set of artificial neural network neuron element weighting factors; and encrypting a message using a public key of a receiver, wherein the message comprises message content in combination with the defined personal electroencephalogram signature; and wherein the encrypted message may be decrypted by the receiver as a function of a private key of the receiver and the trained first set of artificial neural network neuron element weighting factors.

9. The method of claim 8, wherein decryption of the encrypted message as the function of the private key of the receiver and the trained first set of artificial neural network neuron element weighting factors permanently destroys the personal electroencephalogram signature.

10. A system, comprising:

a processor;

a computer readable memory in circuit communication with the processor; and a computer readable storage medium in circuit communication with the processor;

wherein the processor executes program instructions stored on the computer-readable storage medium via the computer readable memory and is thereby caused to:

map each of a plurality of artificial neural network neuron elements to a first set of electroencephalogram data signals that are generated from scanning neural activity of a user while the user executes a current mental activity;

train a first set of artificial neural network neuron element weighting factors to transform the first set of electroencephalogram data signals into a first weighted set of electroencephalogram data signals that are different from second weighted set of electroencephalogram data signals that are generated from scanning neural activity of the user while the user executes another activity that is different from the current mental activity, and from a third weighted set of electroencephalogram data signals that are generated from scanning neural activity of another user while the another user executes a mental activity that corresponds to the current mental activity;

associate the trained first set of artificial neural network neuron element weighting factors with the first set of electroencephalogram data signals and with the current mental activity;

define a reproducible electroencephalogram encryption key that is unique to the user as a function of at least one of the trained first set of artificial neural network neuron element weighting factors and the first weighted set of electroencephalogram data signals;

lock message content via a public key encryption process with the trained first set of artificial neural network neuron element weighting factors functioning as a public key; and send the locked message to the user as a designated receiver.

11. The system of claim 10, wherein the processor executes the program instructions stored on the computer-readable storage medium via the computer readable memory and is thereby caused to:

define a personal electroencephalogram signature for the user as a function of at least one of the trained first set of artificial neural network neuron element weighting factors and the first weighted set of electroencephalogram data signals;

wherein the user is enabled to unlock the message with the personal electroencephalogram signature defined for the user by using the at least one of the trained first set of artificial neural network neuron element weighting factors and the first weighted set of electroencephalogram data signals.

12. The system of claim 10, wherein the processor executes the program instructions stored on the computer-readable storage medium via the computer readable memory and is thereby caused to train the first set of artificial neural network neuron element weighting factors further by defining a learned model profile of the artificial neural network neuron element weighting factors that corresponds to values of the first weighted set of electroencephalogram data signals that are unique to the user and different from values of the third weighted set of electroencephalogram data signals that are generated from scanning the neural activity of the another user while the user executes the current mental activity.

13. The system of claim 10, wherein the processor executes the program instructions stored on the computer-readable storage medium via the computer readable memory and is thereby caused to train the artificial neural network neuron element weighting by defining numerically weighted decision connections between the plurality of neuron elements for exchange of messages between each other that are tuned to correspond to neural processes of the user that are represented by electroencephalogram data.

14. The system of claim 10, wherein the processor executes the program instructions stored on the computer-readable storage medium via the computer readable memory and is thereby caused to:

define a personal electroencephalogram signature for the user as a function of weighting the first set of electroencephalogram data signals with the trained first set of artificial neural network neuron element weighting factors; and encrypt a message using a public key of a receiver, wherein the message comprises message content in combination with the defined personal electroencephalogram signature; and wherein the encrypted message may be decrypted by the receiver as a function of a private key of the receiver and the trained first set of artificial neural network neuron element weighting factors.

15. The system of claim 10, wherein the processor executes the program instructions stored on the computer-readable storage medium via the computer readable memory and is thereby caused to permanently destroy the personal electroencephalogram signature in response to decryption of the encrypted message as the function of the private key of the receiver and the trained first set of artificial neural network neuron element weighting factors.

16. A computer program product for a user-specific, electroencephalogram data-based secure encryption generator, the computer program product comprising:

a computer readable storage medium having computer readable program code embodied therewith, wherein the computer readable storage medium is not a transitory signal per se, the computer readable program code comprising instructions for execution by a processor that cause the processor to:

map each of a plurality of artificial neural network neuron elements to a first set of electroencephalogram data signals that are generated from scanning neural activity of a user while the user executes a current mental activity;

train a first set of artificial neural network neuron element weighting factors to transform the first set of electroencephalogram data signals into a first weighted set of electroencephalogram data signals that are different from second weighted set of electroencephalogram data signals that are generated from scanning neural activity of the user while the user executes another activity that is different from the current mental activity, and from a third weighted set of electroencephalogram data signals that are generated from scanning neural activity of another user while the another user executes a mental activity that corresponds to the current mental activity;

associate the trained first set of artificial neural network neuron element weighting factors with the first set of electroencephalogram data signals and with the current mental activity;

define a reproducible electroencephalogram encryption key that is unique to the user as a function of at least one of the trained first set of artificial neural network neuron element weighting factors and the first weighted set of electroencephalogram data signals;

lock message content via a public key encryption process with the trained first set of artificial neural network neuron element weighting factors functioning as a public key; and send the locked message to the user as a designated receiver.

17. The computer program product of claim 16, wherein the computer readable program code instructions for execution by the processor further cause the processor to:

define a personal electroencephalogram signature for the user as a function of at least one of the trained first set of artificial neural network neuron element weighting factors and the first weighted set of electroencephalogram data signals; and wherein the user is enabled to unlock the message with the personal electroencephalogram signature defined for the user by using the at least one of the trained first set of artificial neural network neuron element weighting factors and the first weighted set of electroencephalogram data signals.

18. The computer program product of claim 16, wherein the computer readable program code instructions for execution by the processor further cause the processor to train the first set of artificial neural network neuron element weighting factors further by defining a learned model profile of the artificial neural network neuron element weighting factors that corresponds to values of the first weighted set of electroencephalogram data signals that are unique to the user and different from values of the third weighted set of electroencephalogram data signals that are generated from scanning the neural activity of the another user while the user executes the current mental activity.

19. The computer program product of claim 16, wherein the computer readable program code instructions for execution by the processor further cause the processor to train the artificial neural network neuron element weighting by defining numerically weighted decision connections between the plurality of neuron elements for exchange of messages between each other that are tuned to correspond to neural processes of the user that are represented by electroencephalogram data.

20. The computer program product of claim 16, wherein the computer readable program code instructions for execution by the processor further cause the processor to:
  define a personal electroencephalogram signature for the user as a function of weighting the first set of electroencephalogram data signals with the trained first set of artificial neural network neuron element weighting factors; and
  encrypt a message using a public key of a receiver, wherein the message comprises message content in combination with the defined personal electroencephalogram signature; and
  wherein the encrypted message may be decrypted by the receiver as a function of a private key of the receiver and the trained first set of artificial neural network neuron element weighting factors.

* * * * *